Jan. 9, 1934.　　　F. W. PETERS　　　1,942,973
FLEXIBLE CONNECTION
Filed Dec. 19, 1928　　　3 Sheets-Sheet 1
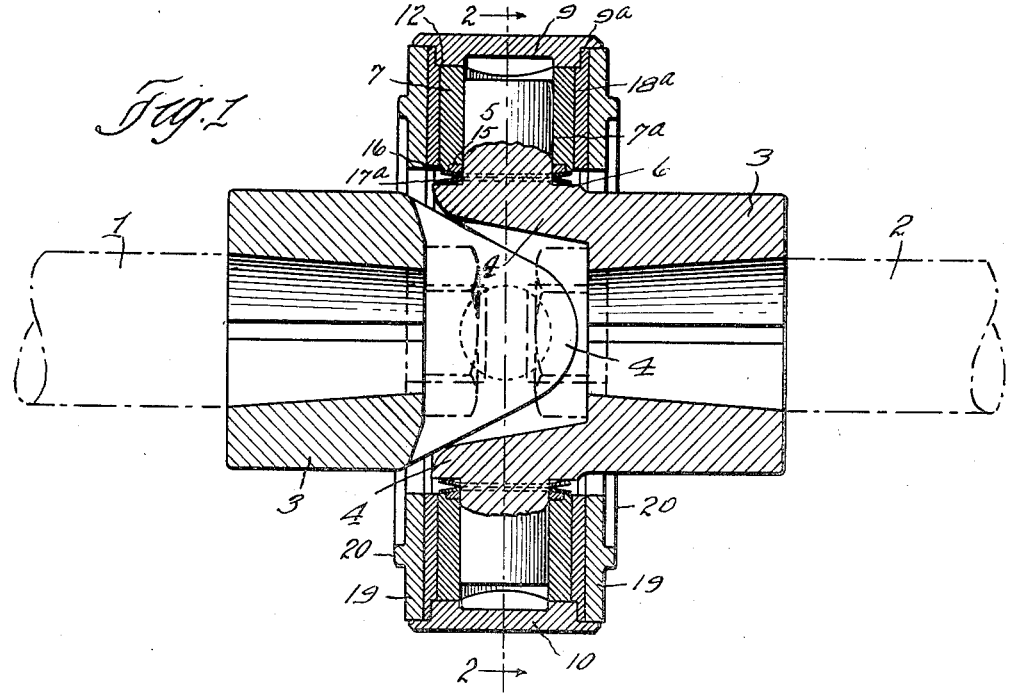
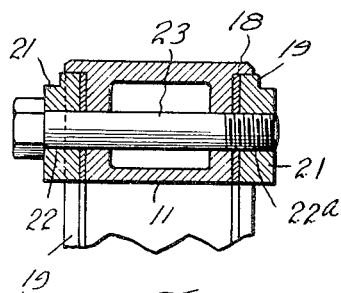
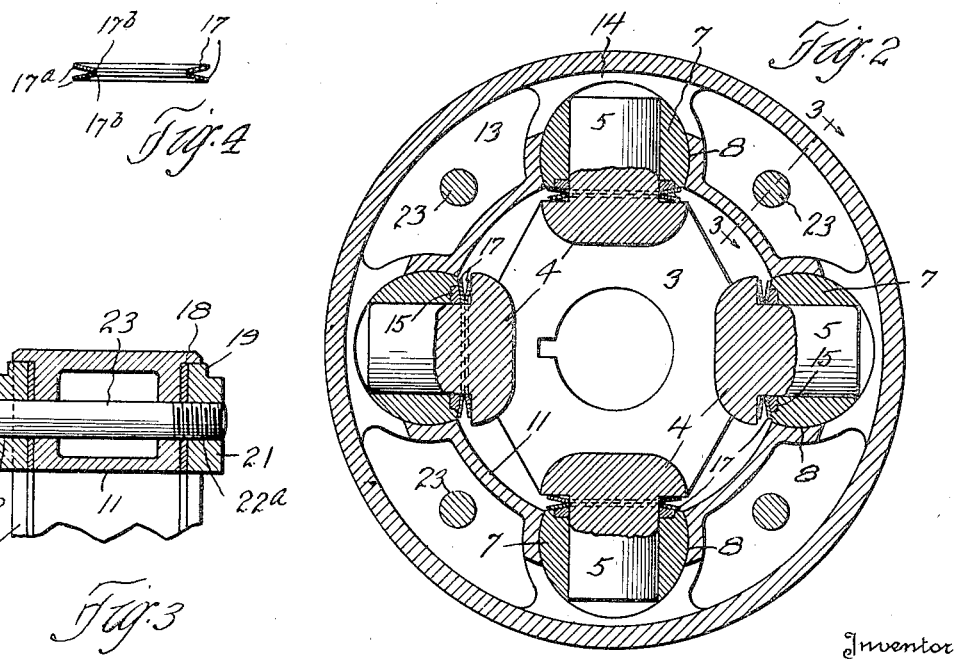
Inventor
Frederick W. Peters,
By Hull, Brock & West,
Attorneys Jan. 9, 1934.   F. W. PETERS   1,942,973
FLEXIBLE CONNECTION
Filed Dec. 19, 1928   3 Sheets-Sheet 2
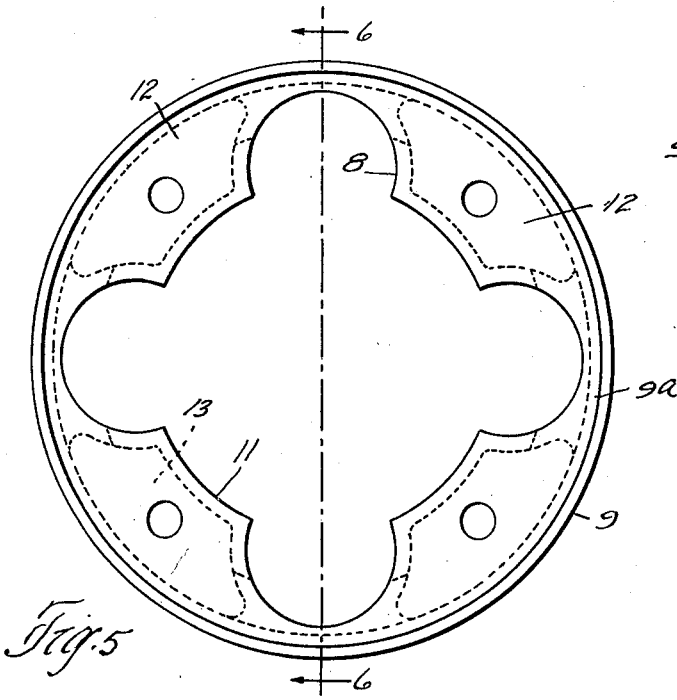
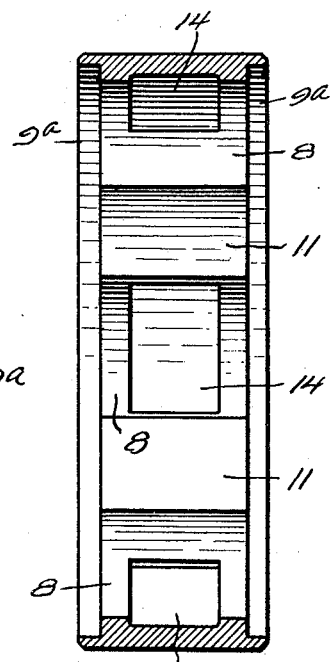
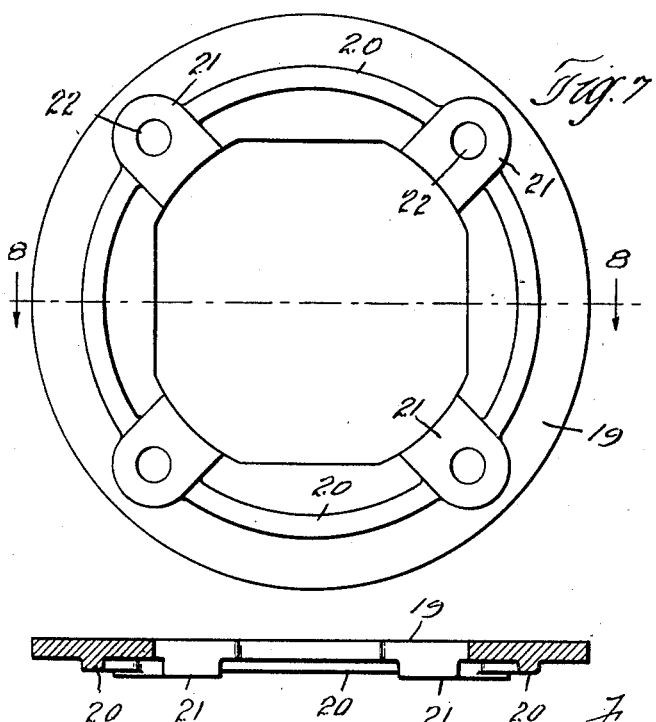
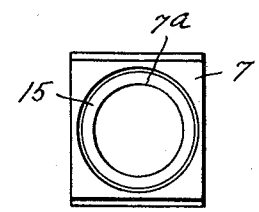
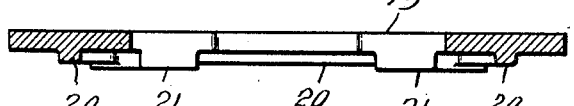

Jan. 9, 1934.  F. W. PETERS  1,942,973
FLEXIBLE CONNECTION
Filed Dec. 19, 1928   3 Sheets-Sheet 3
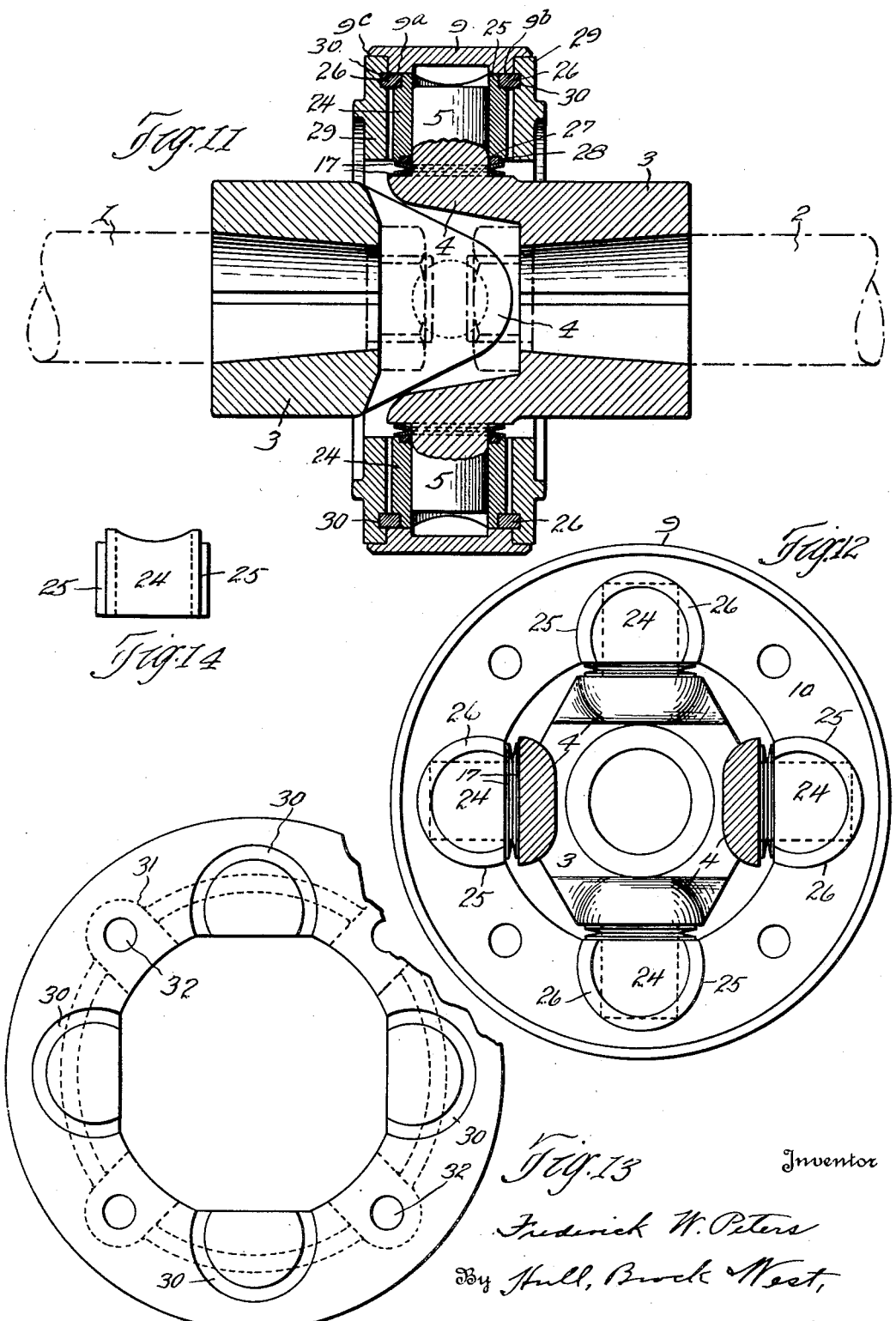

Patented Jan. 9, 1934

1,942,973

UNITED STATES PATENT OFFICE 1,942,973

FLEXIBLE CONNECTION

Frederick W. Peters, Cleveland, Ohio, assignor to The Al-Metal Universal Joint Company, Cleveland, Ohio, a corporation of Ohio Application December 19, 1928
Serial No. 326,915

10 Claims. (Cl. 64—102)

This invention relates to universal joints and similar flexible connections such as are interposed between and connecting a driving and a driven member. It is the general purpose and object of the invention to provide a connection of this character with means whereby the bearings formed between the trunnions and the bores of the bushings or bearing blocks receiving the same may be effectively lubricated.

A further object of the invention is to provide means whereby leakage of lubricant in joints or connections of this character may be effectively prevented and to utilize such leakage-preventing means for the purpose of allowing for and taking up the end thrusts exerted by the bearing blocks.

Further and more limited objects of the invention will appear hereinafter in the specification and will be realized by the construction and arrangement of parts shown in the drawings, wherein Fig. 1 represents a vertical sectional view through a universal joint embodying my invention; Fig. 2 a sectional view corresponding to the line 2—2 of Fig. 1, looking in the direction of the arrows; Fig. 3 a detail in section corresponding to the line 3—3 of Fig. 2, looking in the direction of the arrows; Fig. 4 a detail in section through the spring washers inserted between the bearing blocks and the shoulders at the bases of the trunnions; Fig. 5 a side elevation of the connecting ring, the cooperating clamping plate being removed; Fig. 6 a sectional view of said connecting ring, taken on the line 6—6 of Fig. 5 and looking in the direction of the arrows; Fig. 7 a side elevation of one of the clamping rings; Fig. 8 a sectional view corresponding to the line 8—8 of Fig. 7; Fig. 9 a side elevation of one of the bearing blocks and Fig. 10 an end elevation of one of such blocks; Fig. 11 a view, similar to Fig. 1, showing a modified form of my invention; Fig. 12 a sectional side elevation of the connecting ring shown in Fig. 11 and of the parts assembled therewith; Fig. 13 a side elevation of one of the clamping rings shown in Fig. 11; and Fig. 14 a side elevation of one of the bearing blocks shown in Fig. 11.

Describing the various parts by reference characters, and first in connection with the form of my invention shown in Figs. 1–10 inclusive, 1 and 2 denote shafts which are to be connected by the joint of flexible coupling, each of the shafts having a hub 3 suitably keyed thereto and each hub being provided with a yoke the arms of which are indicated at 4. Each yoke arm is provided with a trunnion 5, there being an annular seat or shoulder 6 formed on each such arm at the base of its trunnion.

Each of the trunnions fits within the bore 7ª of a bearing block 7. Each of these bearing blocks is in the form of a segment of a cylinder, the angular extent of the cylindrical surface being greater than 180 degrees, whereby each block may be received and retained within a seat 8 of like contour extending transversely of and through a connecting ring 9, it being noted that each bearing block is slightly shorter than the length of the bearing bore 8 provided therefor.

The connecting ring comprises an outer cylindrical surface 10 and an inner surface 11 which is generally cylindrical, being intersected by the inner ends of the seats or bores 8. The connecting ring is also provided with sides 12 which are intersected by the seats 8, these sides providing with the inner and outer surfaces 11 and 9 chambers 13 for lubricant and from which lubricant is distributed by centrifugal action over the tops of the blocks 7 and trunnions 5 by ports 14 which connect adjacent chambers.

The radial inner end of each bearing block is provided with an angular recess forming a seat 15 which surrounds the inner end of the bore thereof and in which is inserted a packing 16 of compressible deformable material, such as cork. This packing is pressed into its seat by means of a pair of frusto-conical spring steel washers 17, one of which is applied to a shoulder 6 with its outer edge 17ª resting on said shoulder and the other of which is applied to the trunnion 5 with its outer edge engaging the bottom of the bearing block outside the seat for the packing. The inner edges 17ᵇ of the said washers are in engagement with each other, and the parts are so arranged that, when the trunnions are in their respective bearing blocks, the washers are under compression, thereby forcing the packing rings into their seats and preventing the escape of lubricant between the bases of the trunnions and the inner ends of the bearing blocks.

Reference has been made heretofore to the fact that the bearing blocks are shorter than the bores or seats 8. This is for the purpose of permitting the blocks to move slightly under the influence of thrust operating longitudinally of said blocks. In order to permit of this movement of the blocks and at the same time to seal against leakage the joints between the blocks and their seats, I apply to each side of the connecting ring 9 a washer 18 of deformable material, such as cork. Each of these washers is normally of considerably greater thickness than the depth of the space provided between each end of a bearing block 7 and the adjacent side 12 of the connecting ring; and each washer is of such external diameter as to be received within the transversely extending cylindrical seat 9a which is provided in each side of the connecting ring adjacent the outer cylindrical surface 10 thereof, each washer being of sufficient width to extend to the inner surface 11 of the connecting ring and to cover the ends of the bearing blocks.

The washers 18 are secured in place and clamped under pressure by means of a pair of clamping rings 19 each adapted to fit within a cylindrical seat 9a and each being substantially the same depth as the washer with which it cooperates and the clamping rings are preferably provided each with an external circular strengthening rib 20 and with integral lugs 21 intersecting the said rib. The clamping rings are provided with apertures 22, 22a which extend through the said lugs, the apertures 22a in one of the rings being threaded; and bolts 23 extend through the registering apertures in the lugs of the said rings, being threaded in the apertures 22a and serving to draw the clamping rings together. Under the influence of this clamping action, the material of which the washers 18 are composed flows into the recesses provided between the ends of the bearing blocks and the sides of the connecting ring respectively adjacent thereto, whereby the washers will serve to prevent leakage of lubricant around the ends of the bearing blocks. In addition, the expanded or thickened parts 18a of the washers at the ends of the bearing blocks provide yieldable or compressible means for permitting a limited amount of end play of the bearing blocks and for absorbing the end thrusts produced thereby.

In Figs. 11 to 14 inclusive there is shown a modification of my invention wherein the parts are identical with the parts shown in the preceding views, except as follows:

*a*. Instead of using packing rings or washers extending continuously around each side 12 of the connecting ring, each bearing block 24 is provided at each end thereof with an angular groove or recess 25 extending around the cylindrical portion of such end and forming a seat for a segmental packing ring or washer 26 of the same kind of material as employed for the rings or washers 18. The inner end of each bearing block, however, is provided with a seat 27 similar to the seats 15 provided in the bearing blocks 7 and with a packing ring 28 in said seat, similar to the packing rings 16 in the seats of the bearing blocks 7.

*b*. Each clamping ring 29 is provided with a seating groove 30 corresponding in shape and contour to the seat provided by the groove 25 and the part of the cylindrical surface 9b which overhangs the said groove. The packing rings or washers 26 in this case are clamped under pressure in their seats by the clamping rings 29, each of said clamping rings being provided with an annular reinforcing rib on the outer surface thereof and with integral lugs 31 having apertures 32 therethrough, the lugs and apertures being similar to the lugs 21 and apertures 22 and 22a shown in the preceding embodiment of my invention.

In both forms of my invention seats are provided for the packing material in opposite sides of the connecting ring. In the form shown in Figs. 1–10, these seats are provided by the surfaces 9a which extend laterally outwardly from the portions of the sides therein to the extreme side edges 9c. In the form shown in Figs. 11–14 inclusive, the seats are formed within the parts 9b.

By virtue of the structure disclosed herein, I have produced a flexible connection of the universal-joint type which will not only enable the journals formed between the trunnions and the bearing blocks to be effectively lubricated, but which will prevent the escape of lubricant and at the same time yieldingly take up the end thrusts exerted by the bearing blocks.

Having thus described my invention, what I claim is:

1. A connection of the character described comprising a driving and a driven member each having a yoke provided with trunnions projecting therefrom, with an annular seat surrounding the base of each trunnion, a connecting ring having bearing blocks each having a bore adapted to receive a trunnion and each having at the end thereof which faces the seat of the trunnion therein an annular recess surrounding such trunnion, compressible packing material in said annular recess, and a pair of frusto-conical spring washers interposed between each bearing block and the seat opposed thereto, one of said washers having its outer edge resting on the seat and the other having its outer edge engaging the bearing block outside the recess therein.

2. A connection of the character described comprising a driving and a driven member each having trunnions projecting therefrom, a connecting ring having seats extending transversely therethrough, a bearing block in each of said seats and each having a bore for the reception of a trunnion, the bearing blocks being of less length than the respective transverse seats whereby recesses will be provided in the opposite sides of said ring beyond the ends of the said bearing blocks, a washer of deformable packing material applied to each side of said ring and covering the said recesses, clamping rings covering the said washers, and means for securing the said rings to the connecting ring and for compacting the washers against the sides of such connecting ring whereby the packing material thereof will substantially fill the said recesses.

3. A connection of the character described comprising a driving and a driven member each having trunnions projecting therefrom, a connecting ring having seats extending transversely therethrough, a bearing block in each of said seats and each having a bore for the reception of a trunnion, the bearing blocks being of less length than the respective transverse seats whereby recesses will be provided in the opposite sides of said ring beyond the ends of the said bearing blocks, clamping rings secured to opposite sides of said connecting ring, deformable packing material interposed between the clamping rings and the adjacent ends of the bearing blocks and clamped under pressure by said clamping rings whereby the said packing material will yieldably resist the end thrusts of the said bearing blocks.

4. A connection of the character described comprising a driving and a driven member each having trunnions projecting therefrom, a connecting ring having transverse seats therein, a bearing block in each of said seats and each having a bore for the reception of a trunnion, the bearing blocks being of less length than the respective transverse seats whereby recesses will be provided at one side of said ring beyond the ends of the said bearing blocks, a clamping ring secured to the recessed side of said connecting ring, deformable packing material interposed between the clamping ring and the adjacent ends of the bearing blocks and clamped under pressure by said clamping ring whereby the said packing material will enter said recesses and yieldably resist the end thrusts of the said bearing blocks.

5. A connection of the character described comprising a driving and a driven member each having trunnions projecting therefrom, a connecting ring comprising inner and outer annular surfaces and sides extending radially outwardly from the inner surface toward the outer surface and each merging at its outer edge with a seat extending transversely outwardly therefrom, the said ring having seats located radially inward from the first mentioned seat and through said ring, bearing blocks for said trunnions mounted in the seats extending through the said ring, the said bearing blocks being shorter than the transverse lengths of their respective seats whereby recesses will be provided in the opposite sides of said ring beyond the ends of the said bearing blocks, a washer of deformable packing material fitted within each of the first mentioned transversely extending seats and extending across the ends of the bearing block seats, clamping rings fitted in the first-mentioned seats, and means for connecting the said clamping rings for drawing the same toward each other thereby to compress the washers and force the material thereof into the recesses beyond the ends of the bearing blocks.

6. A connection of the character described comprising a driving and a driven member each having trunnions projecting therefrom, a connecting ring comprising inner and outer annular surfaces and having a side extending radially outwardly from the inner surface toward the outer surface and merging at its outer edge with a cylindrical seat extending outwardly therefrom, the said ring having bearing-block seats extending transversely thereof from and including said side and spaced inwardly from such cylindrical seat, bearing blocks for said trunnions mounted in the seats therefor, the said bearing blocks being shorter than the transverse lengths of their respective seats whereby recesses will be provided in the aforesaid side of said ring beyond the ends of the said bearing blocks, a washer of deformable packing material fitted within the cylindrical seat and extending across the open ends of the bearing block seats, a clamping ring fitted in the cylindrical seat, and means for drawing the clamping ring toward said side thereby to compress the washer and force the material thereof into the recesses beyond the ends of the bearing blocks.

7. A flexible connection of the character described comprising a driving and a driven member each having trunnions projecting therefrom, a connecting ring for said trunnions having seats extending transversely thereof and therethrough, bearing blocks for said trunnions mounted in said seats and being of less length than their respective transverse seats whereby recesses will be provided in the opposite sides of said ring beyond the ends of the said bearing blocks, clamping rings applied to opposite sides of the connecting ring, deformable packing material interposed between each clamping ring and the ends of the bearing blocks adjacent thereto, and means for drawing the said clamping rings toward each other and serving to compress the said packing material whereby it will provide means permitting and yieldingly resisting thrusts exerted by the opposite ends of the said bearing blocks.

8. A flexible connection of the character described comprising a driving and a driven member each having trunnions projecting therefrom, a connecting ring for said trunnions having seats extending transversely thereof from and including one side thereof, bearing blocks for said trunnions mounted in said seats and being of less length than their respective transverse seats whereby recesses will be provided in the said side of said ring beyond the ends of the said bearing blocks, a clamping ring applied to the said side of the connecting ring, deformable packing material interposed between said clamping ring and the ends of the bearing blocks adjacent thereto, and means for drawing the said clamping ring toward the said side and serving to compress the said packing material whereby it will provide means permitting and yieldingly resisting thrusts exerted by the ends of the said bearing blocks.

9. A flexible connection of the character described comprising a driving and a driven member each having trunnions projecting therefrom, a connecting ring for said trunnions having seats extending transversely thereof and therethrough, bearing blocks for said trunnions mounted in said seats and being of less length than their respective transverse seats whereby recesses will be provided in the opposite sides of said ring beyond the ends of the said bearing blocks, clamping rings applied to opposite sides of the connecting ring, and deformable packing material interposed between each clamping ring and the end of the bearing block adjacent thereto, there being a seat extending transversely with respect to each side of the connecting ring for the outer surface of the packing material, and means for drawing the said clamping rings toward each other and serving to compress the said packing material whereby it will provide means permitting and yieldingly resisting thrusts exerted by the opposite ends of the said bearing blocks.

10. A flexible connection of the character described comprising a driving and a driven member each having trunnions projecting therefrom, a connecting ring for said trunnions having seats extending transversely from and including one side thereof, bearing blocks for said trunnions mounted in said seats and being of less length than their respective transverse seats whereby recesses will be provided in the said side of said ring beyond the ends of the said bearing blocks, deformable packing material in each recess adapted to engage the adjacent end position of the bearing block therein, and means carried by said side for engaging such packing material to press the same against the end portions of said blocks, the packing material being normally of greater thickness than the depths of their respective recesses.

FREDERICK W. PETERS.